United States Patent [19]
Berfield et al.

[11] Patent Number: 6,119,304
[45] Date of Patent: Sep. 19, 2000

[54] SELF-EVACUATING VACUUM CLEANER

[75] Inventors: Robert C. Berfield, Jersey Shore; Randy L. Buss, Hughesville; Marcus Rhone, Watsontown, all of Pa.

[73] Assignee: Shop Vac Corporation, Williamsport, Pa.

[21] Appl. No.: 09/281,671

[22] Filed: Mar. 30, 1999

[51] Int. Cl.[7] .................................................. A47L 7/00
[52] U.S. Cl. ................... 15/353; 15/321; 15/352
[58] Field of Search ............................ 15/320, 321, 352, 15/353

[56] References Cited

U.S. PATENT DOCUMENTS

| | | | |
|---|---|---|---|
| 1,661,480 | 3/1928 | Keefer | 15/321 |
| 1,691,164 | 11/1928 | Monk . | |
| 1,840,257 | 1/1932 | Saxe et al. . | |
| 1,849,093 | 3/1932 | Janette . | |
| 1,982,345 | 11/1934 | Kirby . | |
| 2,909,800 | 10/1959 | Grindle et al. . | |
| 3,605,786 | 9/1971 | Machin . | |
| 4,080,104 | 3/1978 | Brown . | |
| 4,348,783 | 9/1982 | Swanson et al. . | |
| 4,801,376 | 1/1989 | Kulitz . | |
| 4,841,595 | 6/1989 | Wiese . | |
| 5,182,834 | 2/1993 | Wright et al. . | |
| 5,184,370 | 2/1993 | Jung . | |
| 5,189,755 | 3/1993 | Yonkers et al. | 15/321 |
| 5,263,225 | 11/1993 | Winters . | |
| 5,287,590 | 2/1994 | Yonkers et al. | 15/353 |
| 5,289,611 | 3/1994 | Yonkers et al. | 15/321 |
| 5,349,722 | 9/1994 | Chayer . | |
| 5,443,362 | 8/1995 | Crites et al. . | |
| 5,465,455 | 11/1995 | Allen | 15/353 |
| 5,555,597 | 9/1996 | Berfield . | |
| 5,715,568 | 2/1998 | Berfield et al. . | |
| 5,850,668 | 12/1998 | Berfield | 15/353 |
| 5,918,344 | 7/1999 | Crevling et al. | 15/353 |
| 5,920,955 | 7/1999 | Berfield | 15/353 |
| 5,966,775 | 10/1999 | Berfield | 15/353 |
| 6,009,596 | 1/2000 | Buss et al. | 15/353 |
| 6,049,940 | 4/2000 | Robitaille | 15/353 |

FOREIGN PATENT DOCUMENTS 2246284A   1/1992   United Kingdom .

Primary Examiner—Terrence R. Till
Attorney, Agent, or Firm—Marshall, O'Toole, Gerstein, Murray & Borun

[57] ABSTRACT

A vacuum cleaner has an electric motor driving an air impeller for creating low pressure and a pump which draws liquid material through an inlet tube from the bottom of a tank and expels it from the tank. A priming apparatus is disposed between the air impeller and the interior of the pump to place the interior of the pump in air flow communication with a low pressure area generated by the air impeller. With the interior of the pump in air flow communication with the low pressure area generated by the air impeller, the pump is able to draw liquid material received by the tank up through the pump inlet to prime the pump.

17 Claims, 14 Drawing Sheets

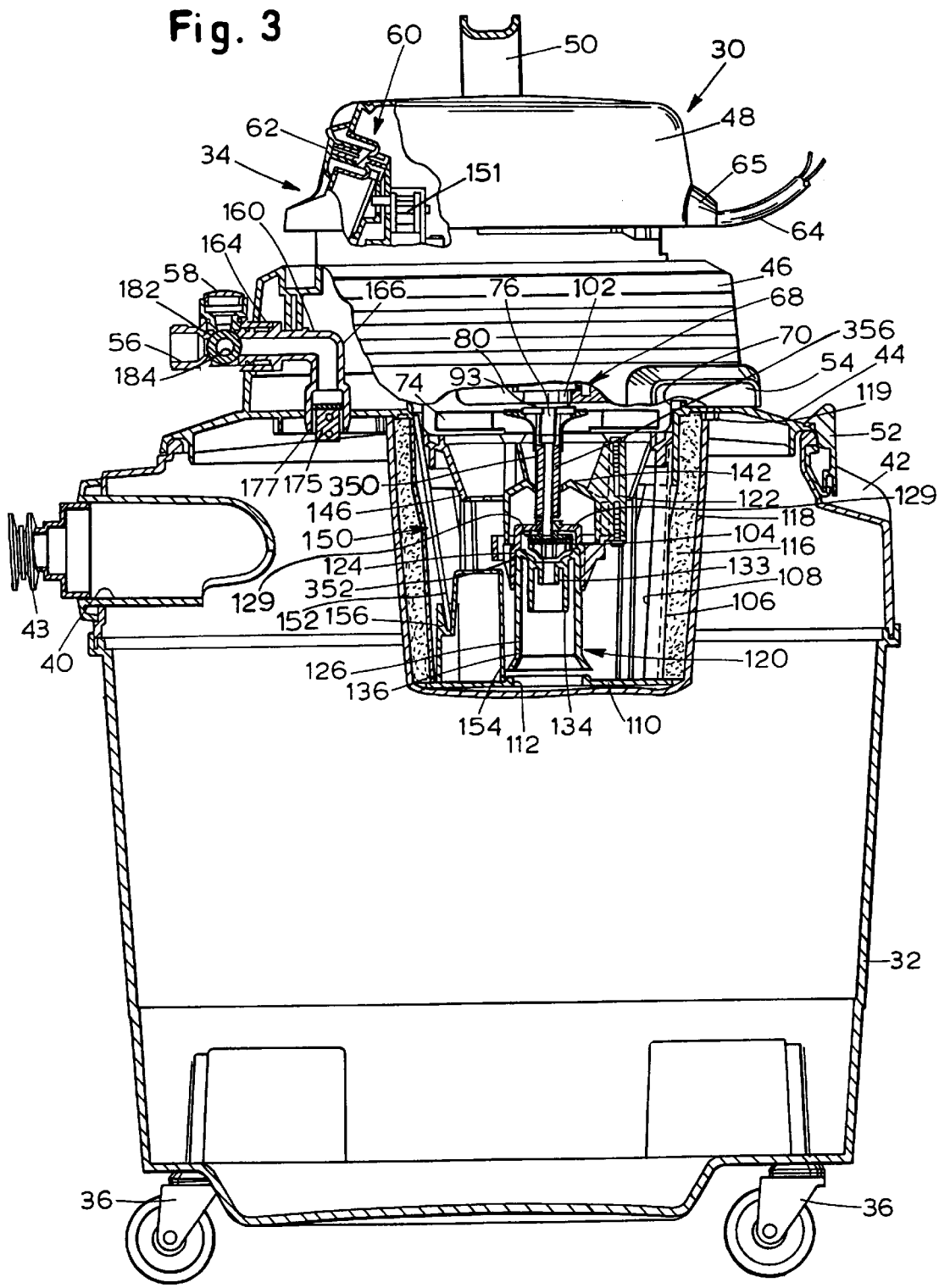

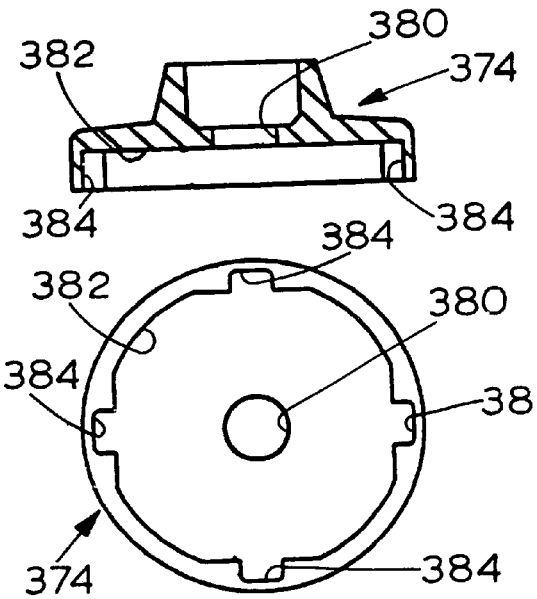
Fig. 9A
Fig. 9B
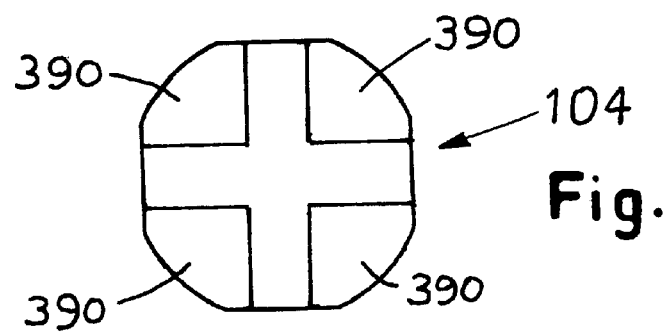
Fig. 9C
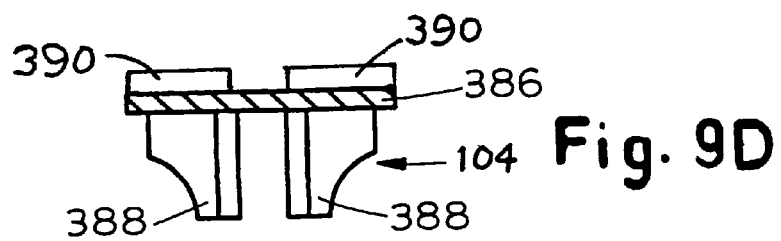
Fig. 9D
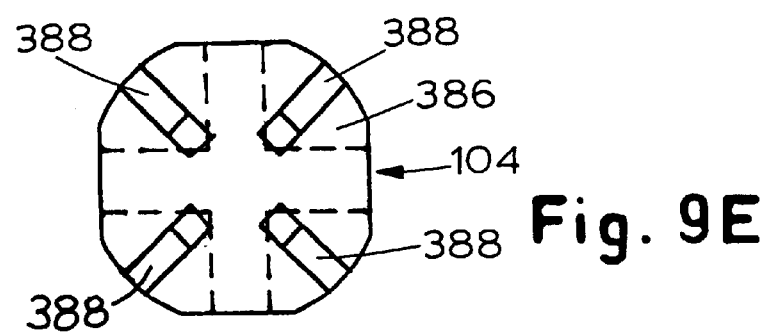
Fig. 9E

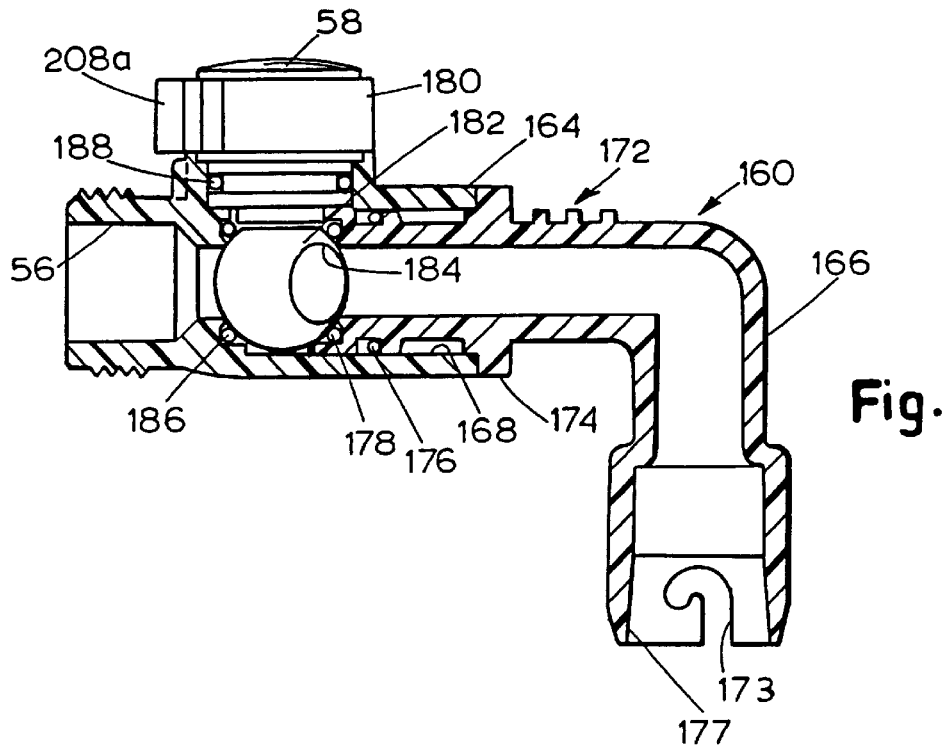
Fig. 10
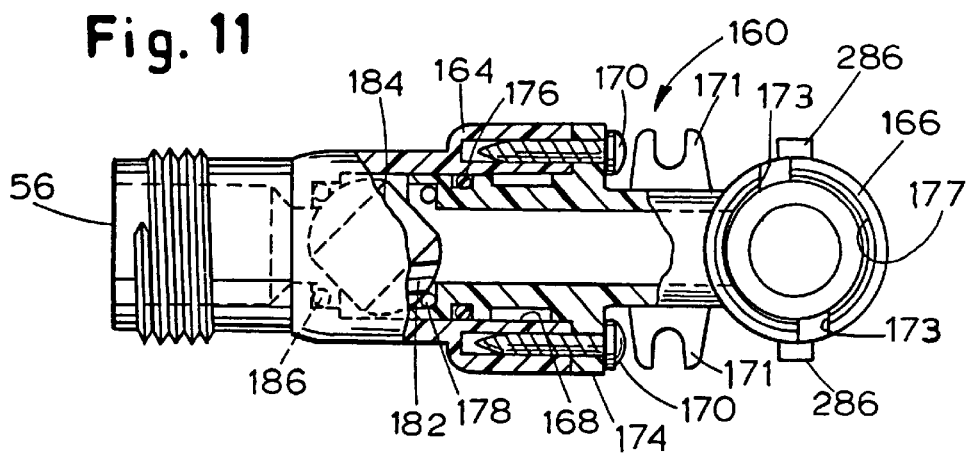
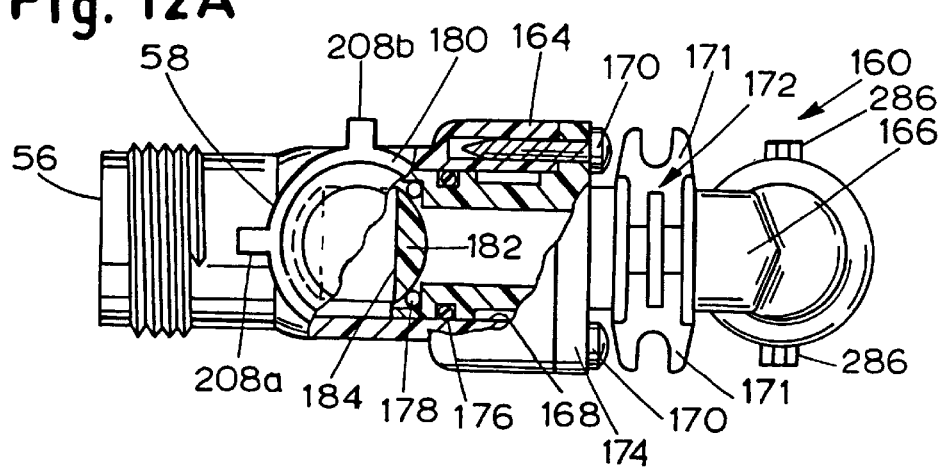

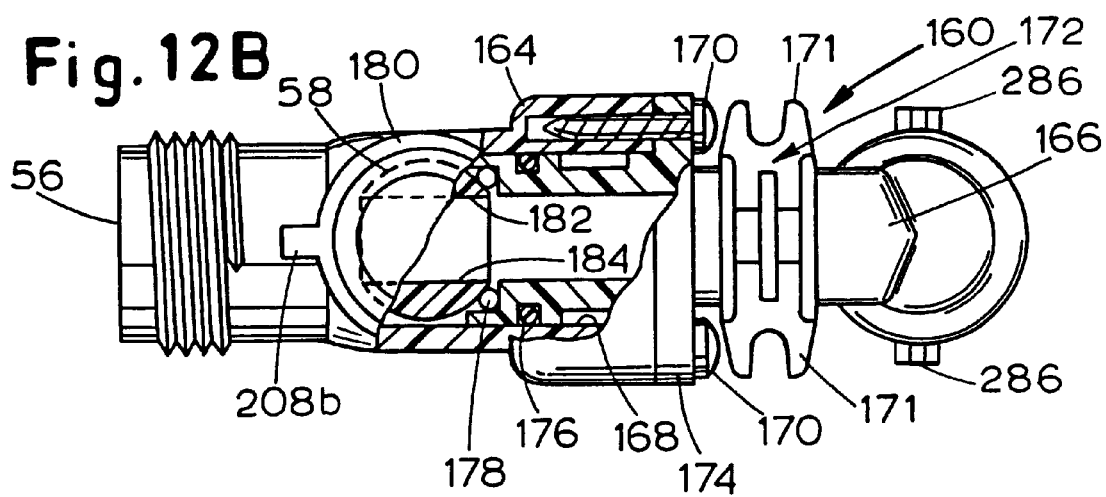

SELF-EVACUATING VACUUM CLEANER

FIELD OF THE INVENTION

The present invention relates to vacuum cleaners, and more particularly to wet/dry vacuum cleaners where liquid material in the tank of the vacuum cleaner is pumped out to waste.

BACKGROUND ART

Tank-type vacuum cleaners are capable of receiving dry materials such as debris or dirt and may also be used for suctioning liquids. When the tank is full, an upper vacuum assembly (which often includes a motor and an air impeller) is removed and the contents are dumped out. If the vacuum cleaner is used on liquid material, the tank, when at or near capacity, may be very heavy so that lifting the tank, to pour the contents into a sink or the like, is difficult. Even tilting the tank to pour the contents into a floor drain may be unwieldy when the liquid level in the tank is high.

One solution to the difficulties encountered in emptying liquid from vacuum tanks has been to provide an outlet at the bottom of the tank. Such a solution is satisfactory when the contents of the tank are emptied into a floor drain; however, if no floor or other low-placed drain is available the tank must be lifted to a sink or similar disposal site. In such cases the outlet at the bottom of the tank is of little value.

A second solution to emptying a vacuum tank of liquid is to provide a pump, usually with a motor located outside of or in the bottom of the tank. The pump removes liquid through a lower portion of the tank and expels it through a hose to waste. While such pumps are generally effective, they may be very costly. The pump requires not only a pump impeller and hoses but also its own electric motor, power cords, and switches. The expense of such items may be significant in the context of the overall cost of a vacuum cleaner, particularly those designed for residential use. Such pumps may also reduce the effective capacity of the vacuum tank or interfere with operation when the vacuum cleaner is used on dry materials. In addition, it may also be necessary to provide costly or complicated structures to prime the pump, if the pump is not located in the bottom of the tank.

SUMMARY OF THE INVENTION

In accordance with one aspect of the present invention, a vacuum cleaner has a tank having an inlet for receiving liquid material and defining an interior, a powered pump defining a pump interior and a pump inlet disposed in the interior of the tank and in fluid communication with the pump. The pump inlet places the interior of the pump in fluid communication with the interior of the tank. The vacuum cleaner further includes an air impeller assembly disposed in air flow communication with the interior of the tank, and a priming apparatus disposed between the air impeller and the pump. The air impeller assembly includes a housing and a driven air impeller disposed in the housing. The housing defines an opening in air flow communication with the interior of the tank and the air impeller defines an interior space. The driven impeller creates a relatively low pressure area in the interior of the tank and in the interior space defined by the air impeller, and the priming apparatus places the interior of the pump in air flow communication with the low pressure area generated in the interior space defined by the air impeller and creates a low pressure area in the pump inlet. The pump is primed when the liquid material received by the tank is drawn through the pump inlet and into the pump interior.

The priming apparatus may include a shaft extension having a shoulder and defining an interior air flow passage and an air flow aperture, and a vacuum director disposed between the air impeller and the shoulder of the shaft extension. The vacuum director and the shaft extension air flow aperture may place the interior air flow passage of the shaft extension in air flow communication with the interior space defined by the air impeller. The priming apparatus may also include a pump impeller assembly connected to the shaft extension. The pump impeller assembly may include a pump impeller cap and a pump impeller. The pump impeller cap may define a pump impeller receptacle with the pump impeller being disposed within the pump impeller receptacle. The pump impeller assembly may define at least one air flow channel that places the pump interior in air flow communication with the interior air flow passage of the shaft extension.

According to another aspect of the present invention the vacuum cleaner may include a liquid discharge assembly that defines a vacuum cleaner discharge opening. The liquid discharge assembly may place the interior of the pump in fluid flow communication with the vacuum cleaner discharge opening for discharging the liquid received by the tank. A valve may also be disposed in the liquid discharge assembly between the pump and the vacuum cleaner discharge opening. The valve regulates the discharge of liquid received by the tank from the vacuum cleaner. The valve may be movable between at least two positions: a first position in which the valve blocks fluid flow communication between the pump and the vacuum cleaner discharge opening, and a second position in which the valve permits fluid flow communication between the pump and the vacuum cleaner discharge opening.

In accordance with another aspect of the present invention, the vacuum cleaner may have a pump that has an upper pump assembly and a lower pump assembly, the liquid discharge assembly may have an upper portion and a lower portion, and the vacuum cleaner further include a pump adapter assembly. The pump adapter assembly may include the lower pump assembly and the lower portion of the liquid discharge assembly. The pump adapter assembly may be removable from the vacuum cleaner and the pump adapter assembly may separate from the vacuum cleaner along the connection between the upper and lower pump assemblies and along the connection between upper and lower portions of the liquid discharge assembly.

Other features and advantages are inherent in the vacuum cleaner claimed and disclosed or will become apparent to those skilled in the art from the following detailed description in conjunction with the accompanying drawings.

BRIEF DESCRIPTION OF THE DRAWINGS

FIG. 3 is a side elevational view, partially in section along the line 3—3 in FIG. 2;

FIG. 9A is side sectional view of a pump impeller cap of the present invention;

FIG. 9B is a bottom view of the pump impeller cap;

FIG. 9C is a top view of a pump impeller of the present invention;

FIG. 9D is a side sectional view of the pump impeller;

FIG. 9E is a bottom view of the pump impeller;

FIG. 10 is a partial view, partially in section, showing an upper portion of a liquid discharge assembly of the present invention;

FIG. 11 is a bottom view, partially broken away and partially in phantom of a ball valve of the liquid discharge assembly;

FIG. 12A is a partially broken away top view of the ball valve of the liquid discharge assembly in a closed (OFF) position;

FIG. 12B is a top view similar to FIG. 12A showing the ball valve in an open (ON) position;

DETAILED DESCRIPTION OF THE EMBODIMENT

Figure 1:
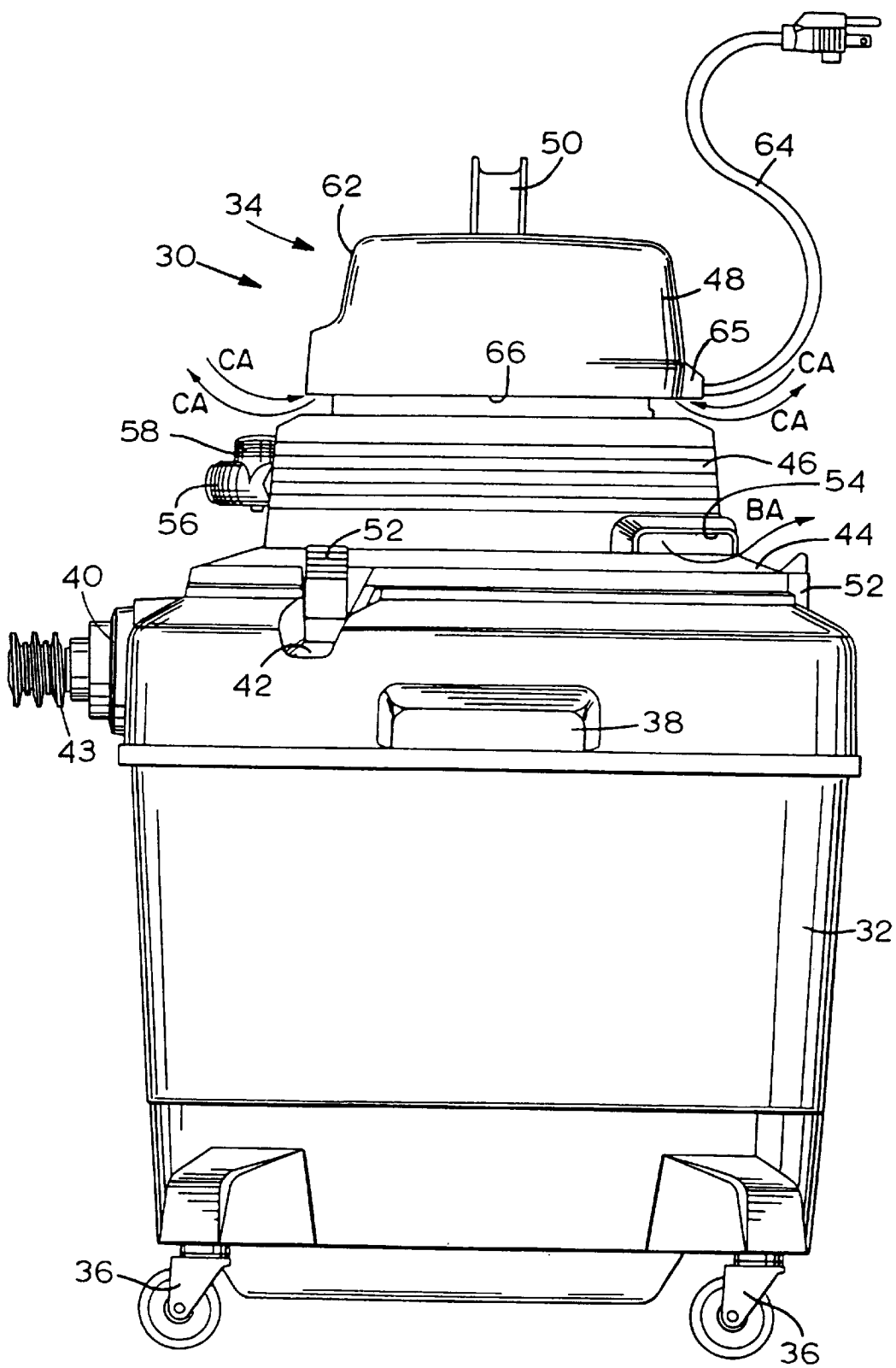
FIG. 1 is a side elevational view of a vacuum cleaner of the present invention.
Figure 2:
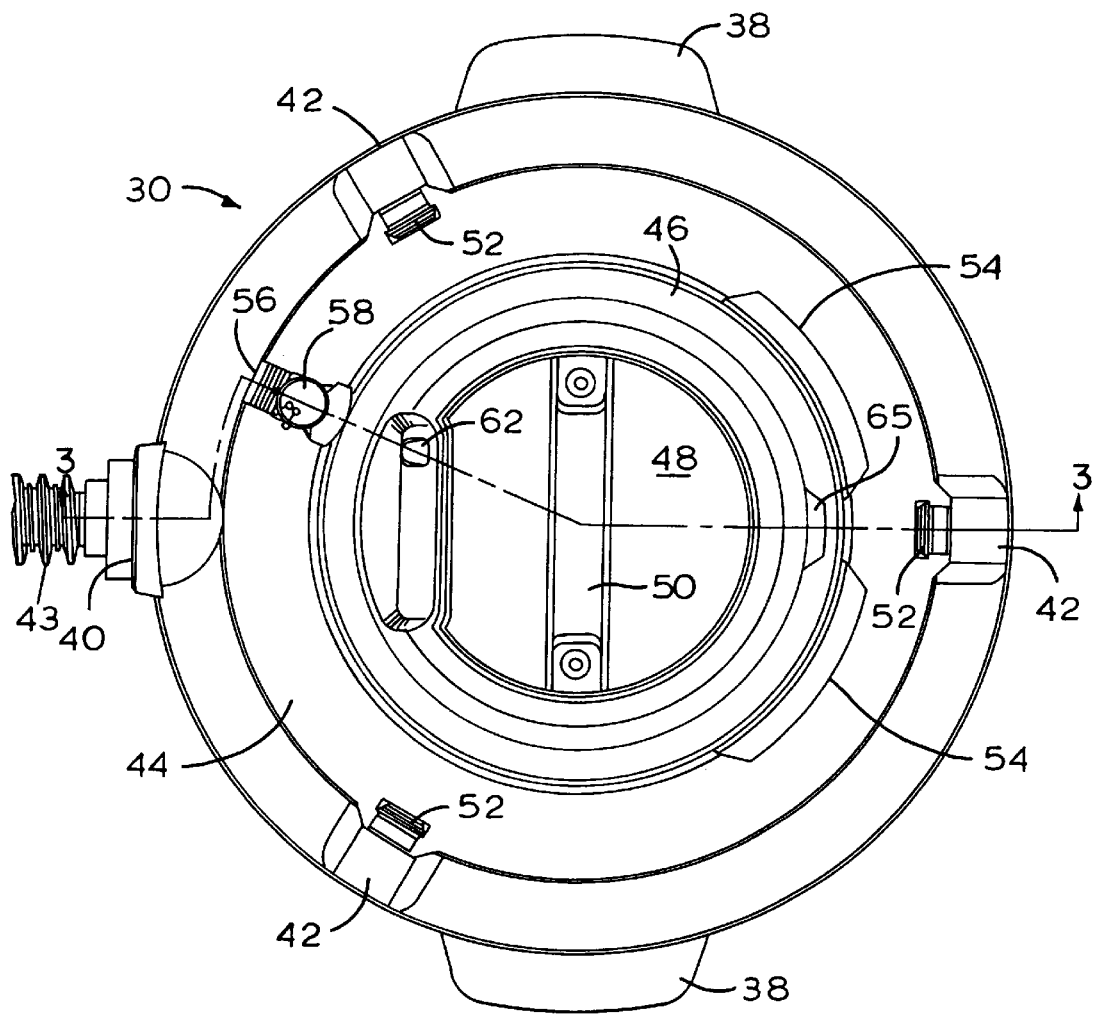
FIG. 2 is a top plan view of a vacuum cleaner of the present invention.

Referring initially to FIGS. 1 and 2, a vacuum cleaner of the present invention, indicated generally at 30, has a tank 32 and an upper vacuum assembly, indicated generally at 34.

The tank 32 is supported by casters 36 and includes a pair of handles 38. The handles 38 may be used to assist the user in lifting and moving the vacuum cleaner 30. The tank 32 further defines a vacuum inlet 40 and a number of latch recesses 42. The vacuum inlet 40 may be fitted with a vacuum hose 43 for applying suction at desired locations.

The tank 32 supports the upper vacuum assembly 34. The upper vacuum assembly 34 includes a lid 44, a motor housing 46, a cover 48 and a handle 50. The upper vacuum assembly 34 may be of conventional construction. Except as described below, the upper vacuum assembly 34 and its associated components may be similar to a Shop Vac Model QL20TS vacuum cleaner as manufactured by Shop Vac Corporation of Williamsport, Pa. The lid 44 makes up the bottom of the upper vacuum assembly 34 and carries one or more latches 52. The motor housing 46 is connected to the top of the lid 44. The cover 48, in turn, is connected to the top of the motor housing 46, and finally, the handle 50 sits atop the cover 48. When a user wishes to connect the upper vacuum assembly 34 to the tank 32, the user lifts the upper vacuum assembly 34 above the tank 32, aligns the latches 52 with the latch recesses 42, lowers the upper vacuum assembly 34 until the lid 44 rests on top of the tank 32, and then, fastens the latches 52 to the tank 32.

The motor housing 46 defines a pair of blower air discharge slots 54. Air drawn into the vacuum cleaner 30 by the inlet 40 is expelled through the blower air discharge slots 54 as shown by the arrow BA in FIG. 1. The motor housing 46 also has a vacuum cleaner discharge opening 56 and a two position ball valve 58 extending therefrom. The cover 48 of the upper vacuum assembly 34 provides a housing for a switch actuation assembly 60 (FIG. 3) which includes a user engageable actuator 62 (FIG. 2). Extending outward from the cover 48 is an electric cord 64 (FIG. 1) which passes through a relief 65 formed in the cover 48. The motor housing 46 and the cover 48 may be formed as two separate, detachable pieces or as one piece, integral with one another. With either construction, the motor housing 46 and the cover 48 define an air passage 66 which allows air to enter and exit the cover 48, as shown by the arrows CA in FIG. 1.

Figure 4A:
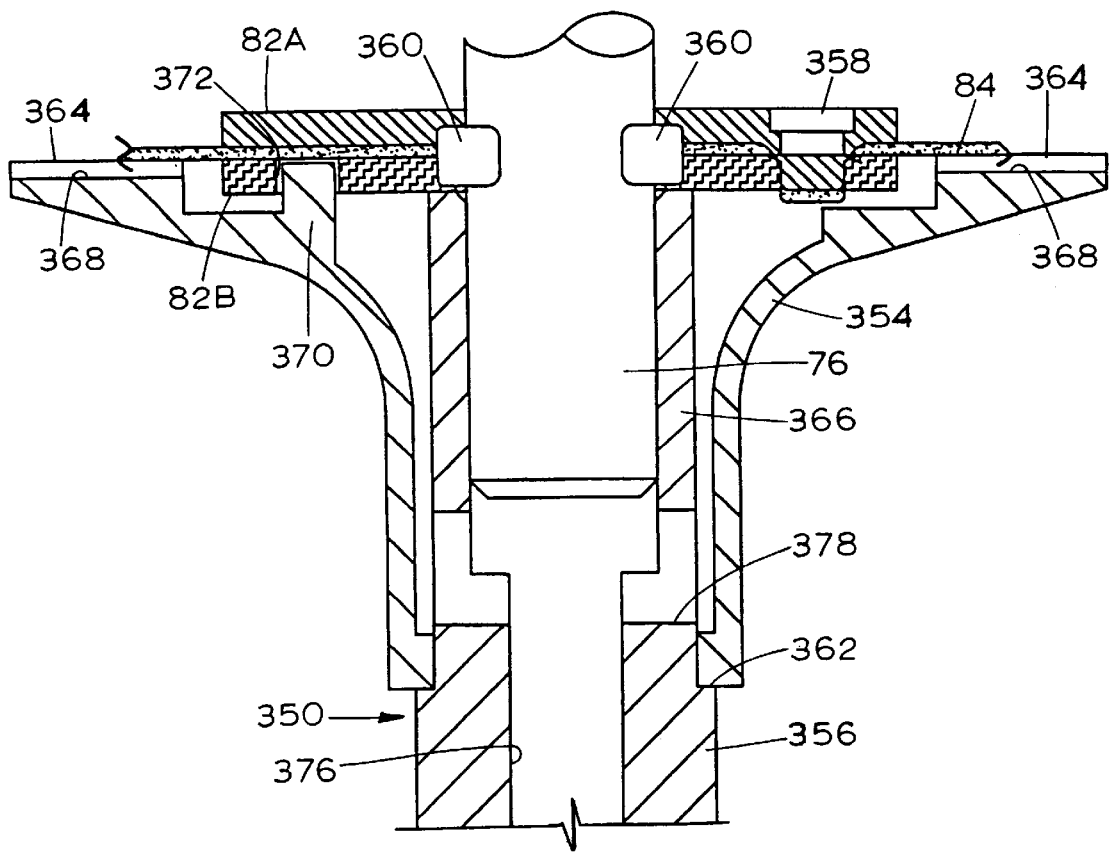
FIG. 4A is a partial view, partially in section, of the upper portion of the priming apparatus.
Figure 4:
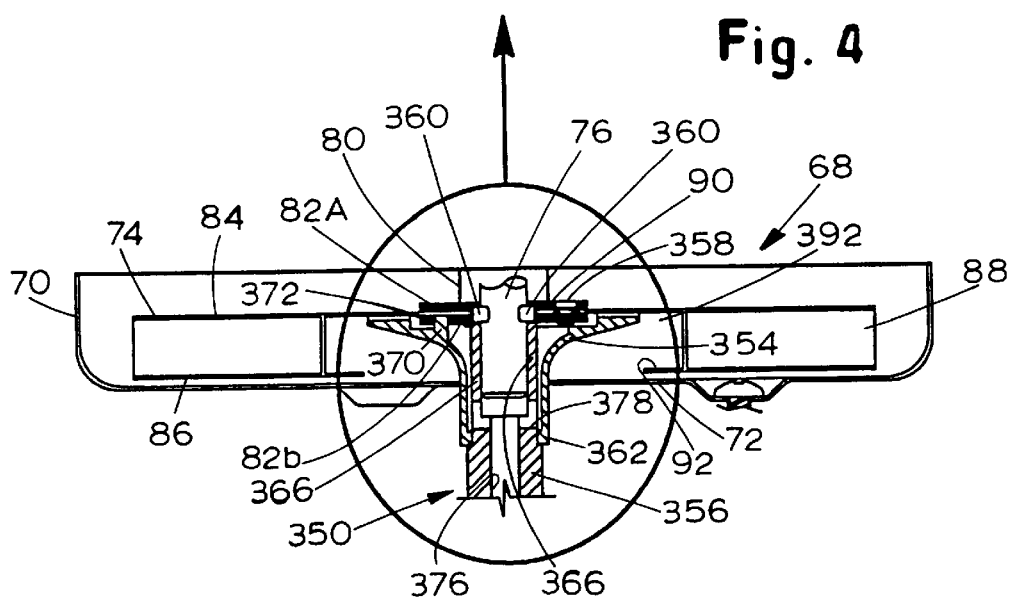
FIG. 4 is a partial view, partially in section, showing an air impeller assembly and an upper portion of a priming apparatus of the present invention.
Figure 14:
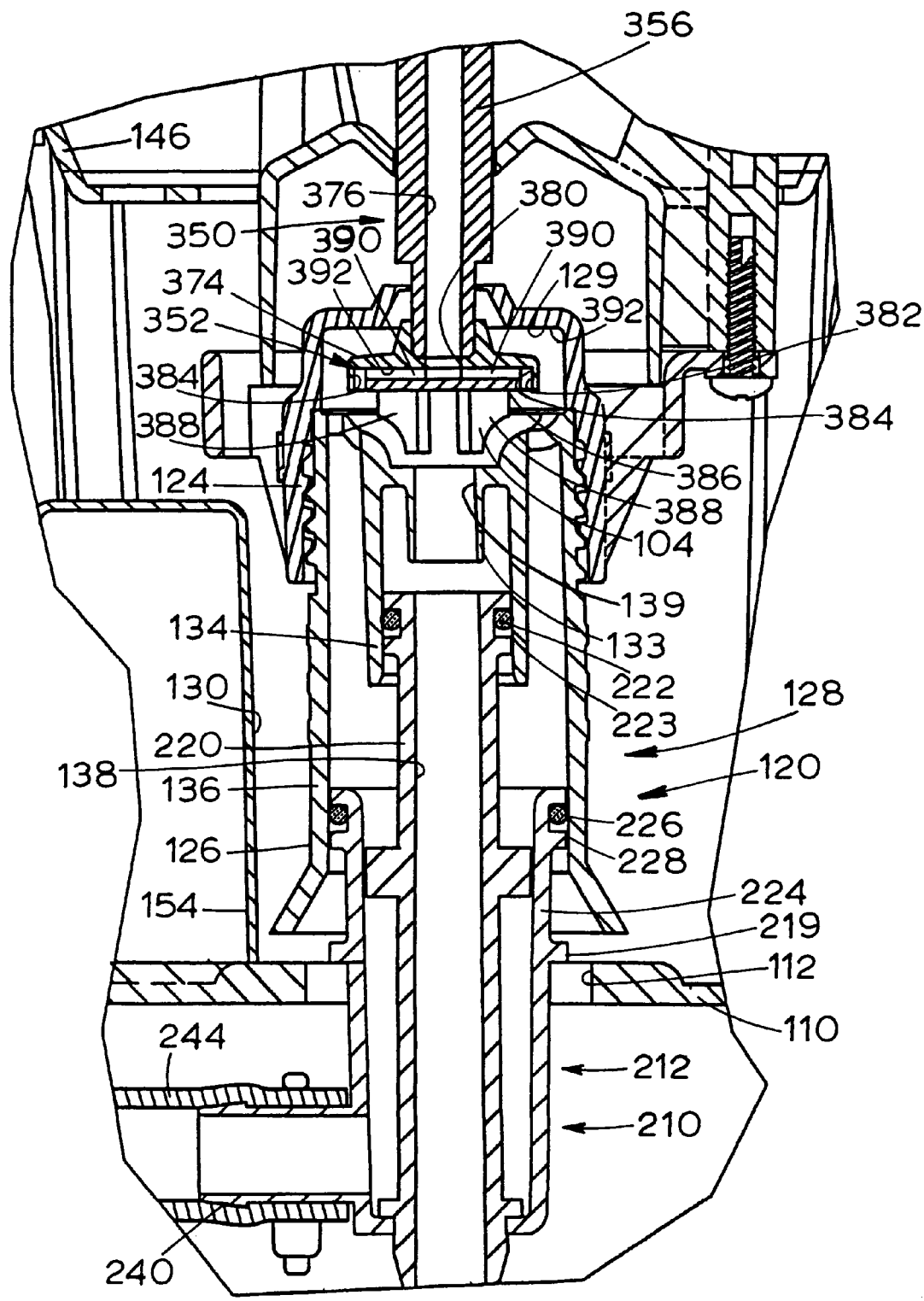
FIG. 14 is an enlarged view of a pump of FIG. 13.

Referring now to FIG. 3, a lid cage 106 is formed integral with the lid 44 of the upper vacuum assembly 34 and extends downward therefrom into the interior of the tank 32. Disposed within the combination of the lid cage 106 and the upper vacuum assembly 34, among other things, is a motor 93 having a motor shaft 76. The motor shaft 76 is in engageable contact with an air impeller 74 of an air impeller assembly 68, and the end of the motor shaft 76 is disposed in a priming apparatus 350. The priming apparatus 350 has a pump impeller assembly 352 that is disposed within a pump chamber 129 that is defined by an upper pump assembly, indicated generally at 120. As described below, the upper pump assembly 120 forms the upper portion of a pump 128 (FIG. 14). Referring to FIGS. 4 and 4A, the air impeller assembly 68 also includes an air impeller housing 70, and the air impeller 74 is suspended within the housing 70 by the interaction of the motor shaft 76 and the priming apparatus 350. (If desired, multiple air impellers may be used in the vacuum cleaner 30.) The motor shaft 76 extends from the motor 93, passes through a separation sleeve 80, an upper washer 82A, an opening 90 formed in an upper plate 84 of the air impeller 74, a lower washer 82B and is press fit into a shaft extension 356 of the priming apparatus 350, securing the shaft extension 356 to the motor shaft 76. The separation sleeve 80 and the upper washer 82A are disposed between the upper plate 84 and a motor bearing 102 (FIG. 3), and the lower washer 82B is disposed between the upper plate 84 and the shaft extension 356. The washers 82A, 82B are secured in place by a series of rivets 358 that are pressed into the upper washer 82A, the upper plate 84 and the lower washer 82B. The washers 82A, 82B act to stabilize the air impeller 74 during operation. The upper washer 82A, the upper plate 84 and the lower washer 82B are notched around the opening 90 of the upper plate 84 to receive a pair of swages 360 formed integral with the motor shaft 76 that extend outward therefrom. In operation, the swages 360 engage the upper plate 84 of the air impeller 74 to rotate the air impeller 74 with the motor shaft 76.

Figure 5:
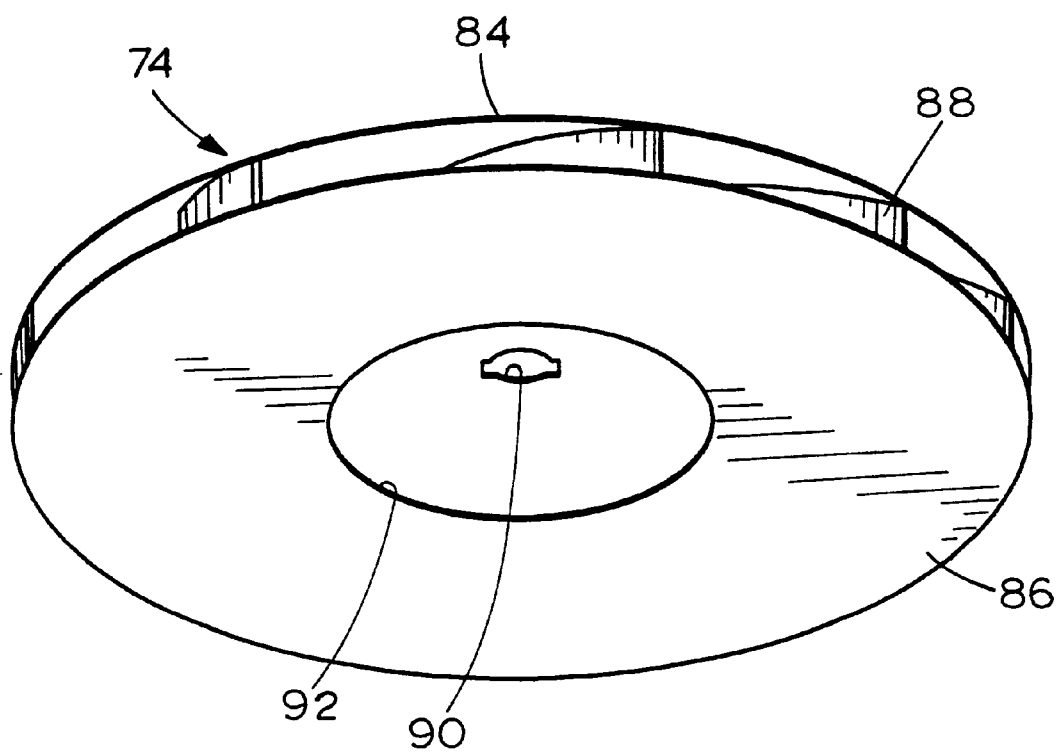
FIG. 5 is a perspective view of an air impeller of the present invention.
Figure 6:
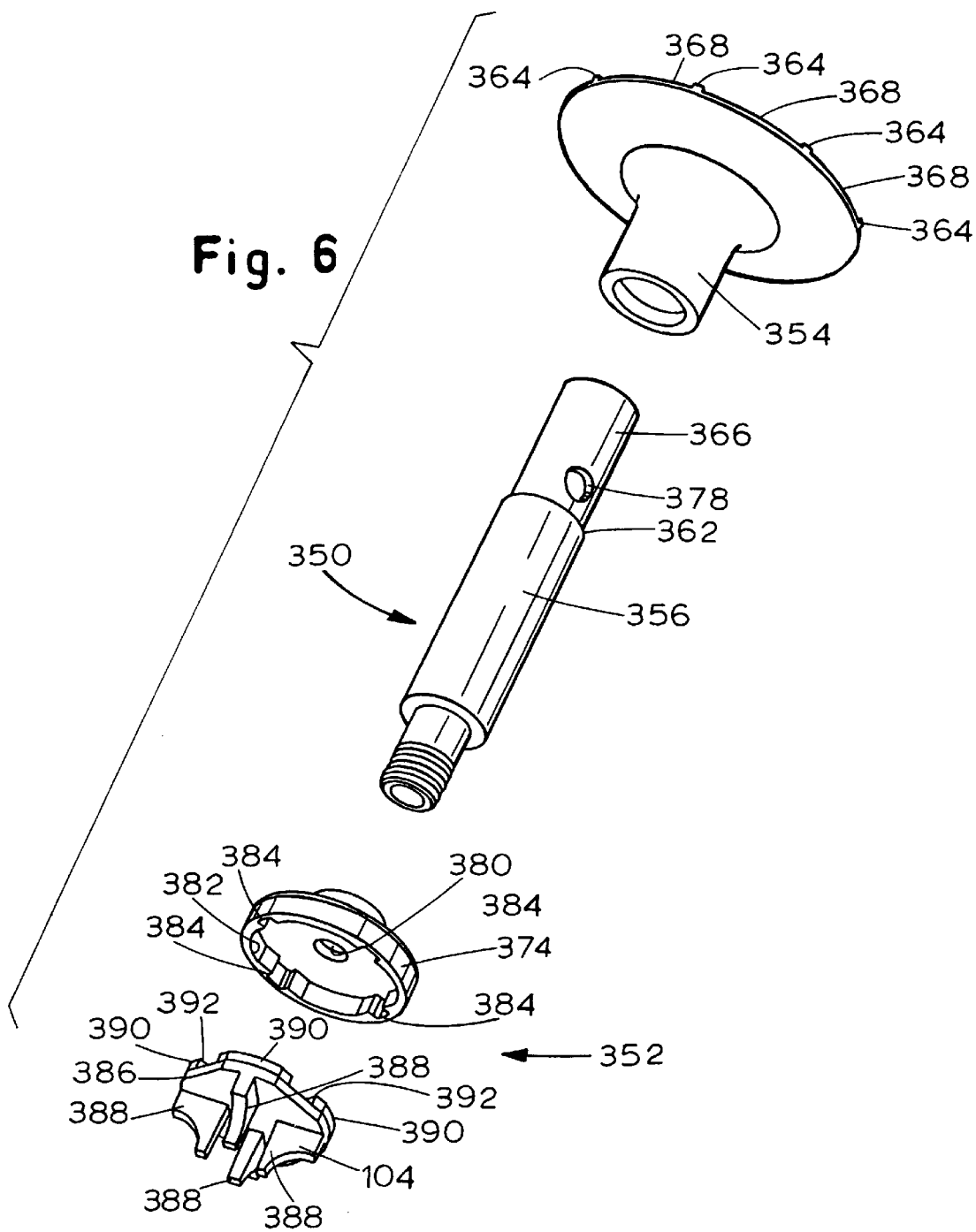
FIG. 6 is an exploded view of a portion of the priming apparatus of the present invention.
Figure 7:
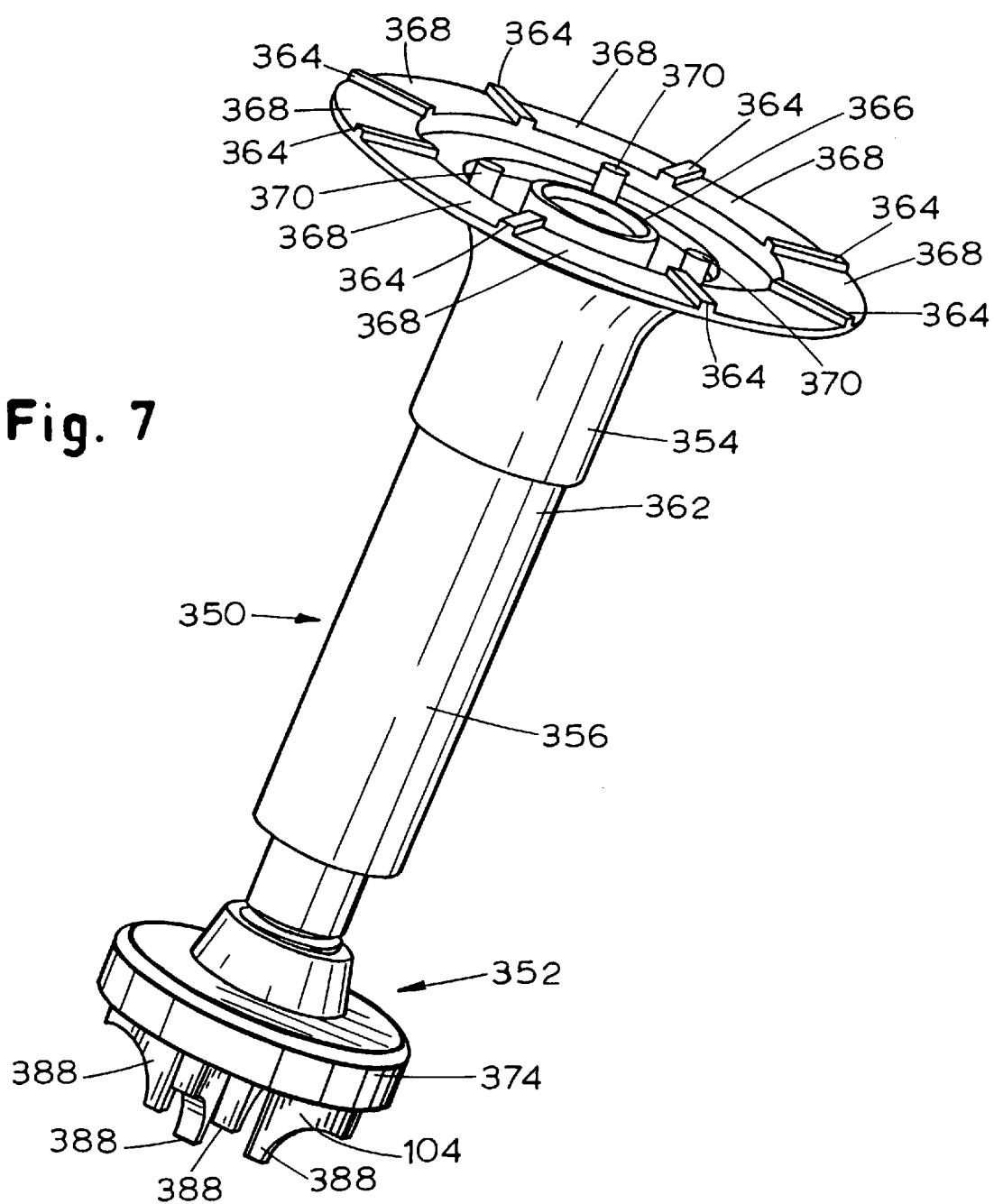
FIG. 7 is a perspective view of a portion of the priming apparatus of the present invention.

The shaft extension 356 has a shoulder 362 formed therein. Disposed between the shoulder 362 of the shaft extension 356 and the upper plate 84 of the air impeller 74 is a vacuum director 354 of the priming apparatus 350. The vacuum director 354 defines an air flow path between an interior space 392 defined by the air impeller 74 (FIG. 4) and an air flow aperture 378 formed in an upper portion 366 of the shaft extension 356. As more clearly illustrated in FIG. 7, a series of ribs 364 is formed along the top of the vacuum director 354. The ribs 364 space the top of the vacuum director 354 from the upper plate 84 of the air impeller 74 and define a series of air flow channels 368 which permit air flow between the air impeller interior space 392 and the interior of the vacuum director 354. Also formed in the vacuum director 354 are three bosses 370. The bosses 370 are disposed in three openings 372 formed in the lower washer 82B (FIG. 4A). The bosses 370 ensure that when the motor 93 is operating, the vacuum director 354 rotates in unison with the motor shaft 76 and does not slip. As illustrated in FIG. 5, the air impeller 74 also includes a series of blades 88 disposed between the upper plate 84 and a lower plate 86.

Figure 8:
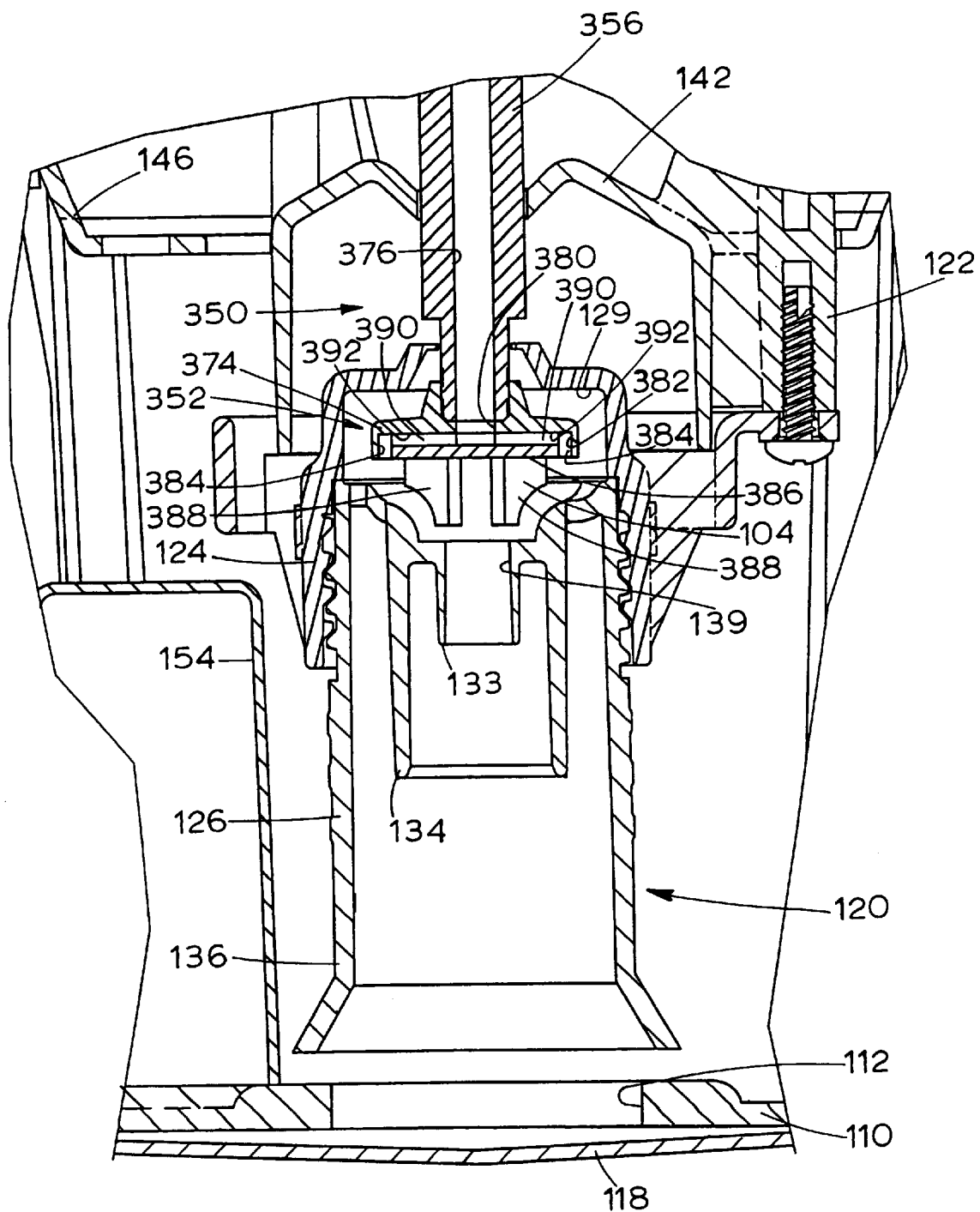
FIG. 8 is an enlarged view of a pump housing of FIG. 3.

Referring to FIGS. 4 and 6–8, the shaft extension 356, secured in place on the motor shaft 76, extends from the flat washer 82B through an opening 92 formed in the lower plate 86 of the air impeller 74, through an opening 72 formed in the air impeller housing 70, and, eventually, threads into the pump impeller assembly 352 disposed in the pump chamber 129 of the upper pump assembly 120 (FIG. 8).

Figure 9F:
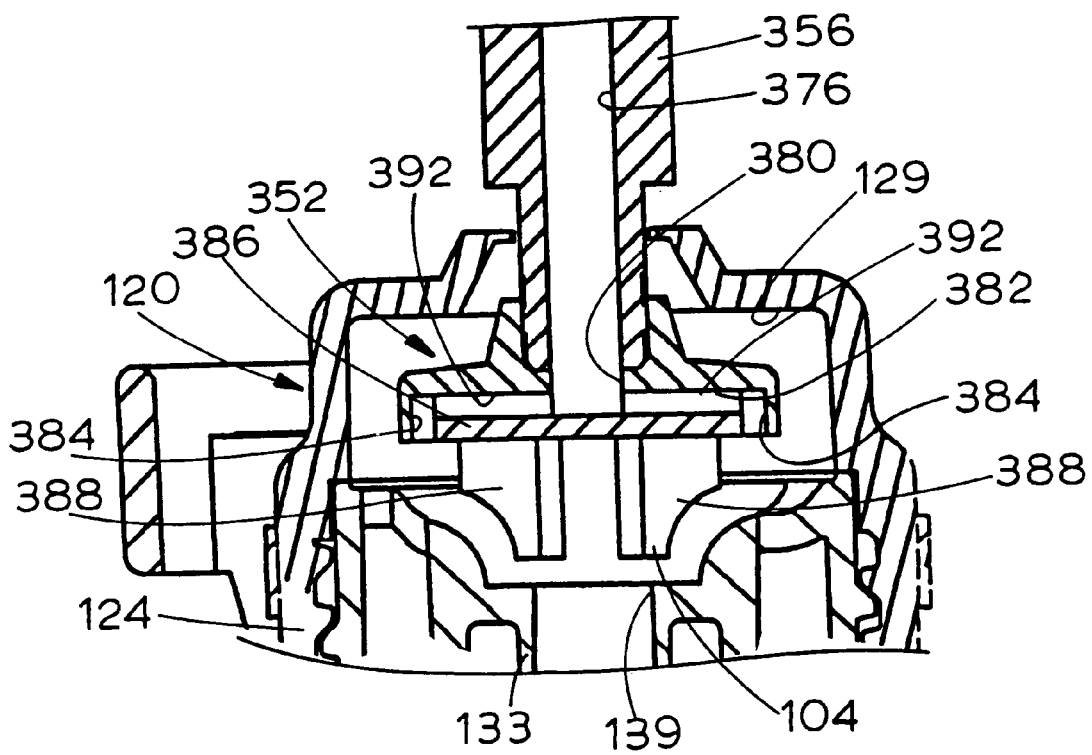
FIG. 9F is a partial view, in section, showing a pump impeller assembly of the present invention disposed in a pump chamber.
Figure 9G:
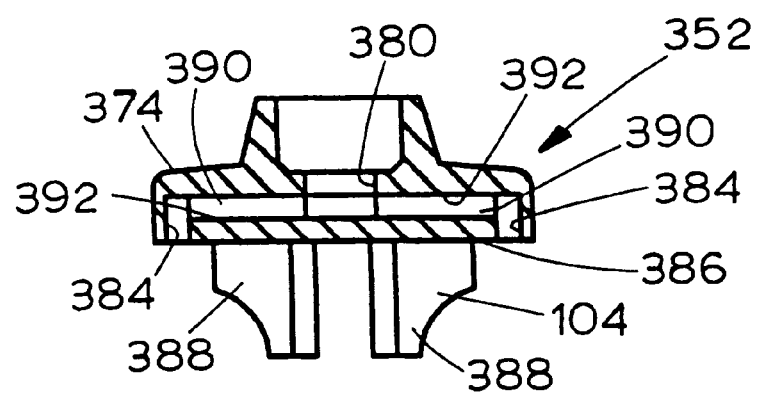
FIG. 9G is a side sectional view of the pump impeller assembly.

Referring to FIGS. 9A–9G, the pump impeller assembly 352 is shown in greater detail. The pump impeller assembly 352 includes a pump impeller cap 374 (FIGS. 9A and 9B) and a pump impeller 104 (FIGS. 9C, 9D and 9E) which are preferably made of nylon 6. The pump impeller cap 374 of the pump impeller assembly 352 defines an aperture 380 and a pump impeller receptacle 382. The pump impeller receptacle 382 defines four air flow cavities 384. The pump impeller 104 includes a base plate 386 that is press fit into the pump impeller receptacle 382, securing the pump impeller 104 in the pump impeller receptacle 382. Formed integral with the base plate 386 and extending downward therefrom are four impeller blades 388. Formed integral with the base plate 386 and extending upward therefrom are four spacers 390 that separate the base plate 386 from the pump impeller cap 374. The spacers 390, in combination with the pump impeller cap 374, form four air flow channels 392 in the pump impeller assembly 352. The pump impeller air flow channels 392 line up with the air flow cavities 384 formed in the pump impeller receptacle 382 to form an air flow path. The air flow path runs from the pump chamber 129 in the upper pump assembly 120, through the air flow cavities 384 formed in the pump impeller receptacle 382, through the pump impeller air flow channels 392 and through the pump impeller cap aperture 380 (FIG. 9F). A passage 376 is formed in the center of the shaft extension 356. The passage 376 connects the air flow path formed in the pump impeller assembly 352 with the air flow path that runs between the air flow aperture 378 in the shaft extension and the air impeller interior space 392 (FIG. 4) to form a continuous, uninterrupted air flow path that runs from the pump chamber 129 to the interior space 392 defined by the air impeller 74.

Referring again to FIG. 3, the lid cage 106 includes several braces 108 that support a bottom plate 110. The bottom plate 110 defines an oblong opening 112. A removable foam filter 116 surrounds the circumference of the lid cage 106 and, as depicted in FIG. 3, a cloth filter 118 may be placed around the lid cage 106 during dry use of the vacuum cleaner 30 to keep dust from entering the opening 112 and interfering with the lid cage assemblies. A mounting ring 119 holds the foam and cloth filters 116, 118 in place. The mounting ring 119 is put in place by sliding the ring 119 over the foam and cloth filters 116, 118 and sliding the ring 119 up to the bottom of the lid 44. Instead of using a separate foam and cloth filter 116,118, as described above, a unitary cartridge filter may be used which allows for easier replaceability.

The upper pump assembly 120 attaches to a pump mount 122 which connects the upper pump assembly 120 to the air impeller housing 70. As detailed in FIG. 8, the upper pump assembly 120 includes an upper impeller housing 124 which is connected to the pump mount 122; a lower impeller housing 126 which, in this embodiment, is threaded into the upper impeller housing 124; and the pump impeller assembly 352 which, as described above, is connected to the shaft extension 356. The interior of the upper impeller housing 124 and the top of the lower impeller housing 126 form the pump chamber 129. The shaft extension 356 keeps the pump impeller assembly 352 suspended in the pump chamber 129 between the upper and lower impeller housings 124, 126 allowing the pump impeller assembly 352 to rotate freely therein. The upper and lower impeller housings 124, 126 are preferably made from acrylonitrile-butadiene styrene copolymer ("ABS").

Referring now to FIG. 14, the lower impeller housing 126 defines a series of annular sidewalls: an upper outlet sidewall 136, an inlet sidewall 134 and a impeller protection sidewall 133. The upper outlet sidewall 136 is the outermost and longest sidewall of the lower impeller housing 126, and when the pump 128 is assembled, the upper outlet sidewall 136 forms part of a pump outlet 130. The bottom portion of the upper outlet sidewall 136 is flared outward to ease assembly of the pump 128. The inlet sidewall 134 is disposed between the upper outlet sidewall 136 and the impeller protection sidewall 133 and is of intermediate length. The inlet sidewall 134 forms part of a pump inlet 138 when the pump 128 is assembled. The impeller protection sidewall 133 is the innermost and shortest sidewall of the lower impeller housing 126 and forms an opening 139 which allows fluid communication between the pump inlet 138 and the pump chamber 129 when the pump 128 is assembled. The impeller protection sidewall 133 serves to keep objects larger than the diameter of the impeller protection sidewall 133 (e.g. a user's finger) away from the pump impeller 104 when the pump impeller 104 is in operation. As an alternative to using an impeller protection sidewall 133, a screen or other restrictive device may be disposed across the interior of the inlet sidewall 134 to perform the same function of preventing foreign objects from passing through the opening 139 and interfering with the pump impeller 104. A liquid deflector 142, formed integrally with the pump mount 122, is situated above the upper impeller housing 124 between the air impeller housing 70 (FIG. 3) and the upper impeller housing 124. The liquid deflector 142 helps to prevent liquid from entering the air impeller assembly 68 and interfering with the operation of the air impeller 74.

Referring again to FIG. 3, the lid cage 106 also encloses an air impeller protection cage 146. The air impeller protection cage 146 extends downward from the bottom of the air impeller housing 70 and is disposed around the pump mount 122. The protection cage 146 acts to keep large debris out of the air impeller assembly 68 to prevent such debris from interfering with the operation of the air impeller 74. The protection cage 146 is formed of ribbed slats which allow the protection cage 146 to keep large debris out of the air impeller assembly 68 while allowing air to flow between the air impeller assembly 68 and the tank 32.

The upper vacuum assembly 34 also houses a mechanical shut-off and override assembly indicated generally at 150. The mechanical shut-off and override assembly 150 includes the aforementioned switch actuation assembly 60, a switch 151, a float rod 152 and a float 154. The mechanical shut-off and override assembly 150 may be of any conventional design or may be of the type disclosed and claimed in U.S. patent application Ser. No. 08/727,318 now U.S. Pat. No. 5,968,344. In this embodiment, the switch actuation assembly 60 and the switch 151 are located in the cover 48, and the float 154 rests on the bottom plate 110 of the lid cage 106. The switch 151 controls the power to the motor 93 and has an "ON" and "OFF" position. The switch 151 is linked to the user engageable actuator 62 and to the float 154. The float 154 is hollow and may be made of any suitable material, such as copolymer polypropylene. The float 154 defines a rod receptacle 156 in which the float rod 152 sits. The float rod 152 extends upward from the float 154 and passes through the lid 44 and the motor housing 46, providing the linkage between the switch 151 and the float 154.

Figure 13:
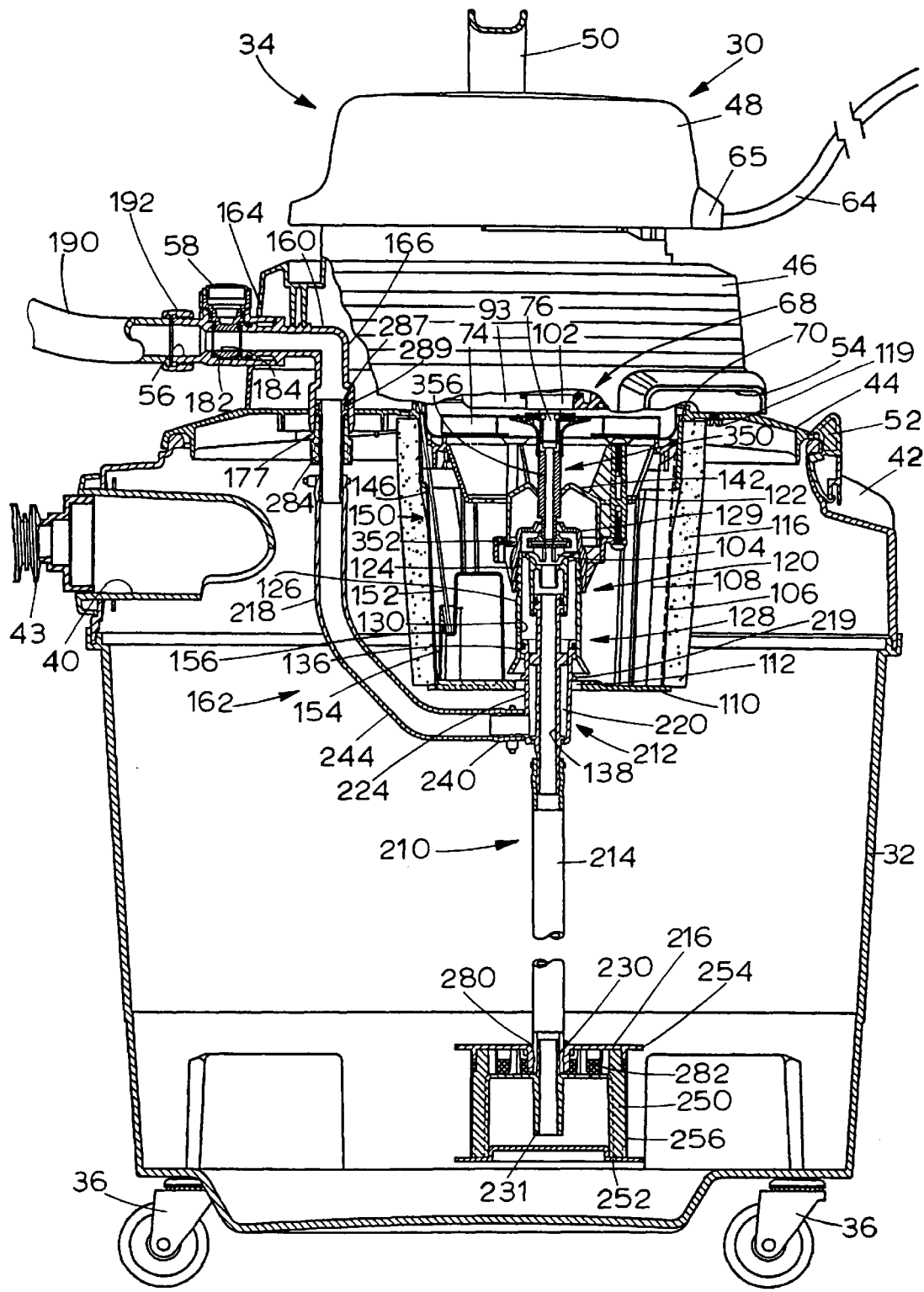
FIG. 13 is a view similar to FIG. 3 with a pump adapter assembly installed and a discharge hose attached to the vacuum cleaner of the present invention.

Also housed in the upper vacuum assembly 34 is an upper portion 160 of a liquid discharge assembly 162 (FIG. 13). Referring to FIGS. 10–12B, three main components form the structure of the upper portion 160 of the liquid discharge assembly 162: a valve housing 164, the two position ball valve 58 and a discharge elbow 166. As seen in FIG. 10, the elbow 166 seats in an elbow cavity 168 formed in the housing 164, and the elbow 166 is connected to the housing 164 by any means practical—a pair of screws 170 (FIG. 11) in this embodiment. A pair of connection tabs 171 (FIG. 11) and a series of positioning ribs 172 are formed integral with the elbow 166. When the vacuum cleaner 30 is assembled, the connection tabs 171 are used to connect the upper portion 160 of the liquid discharge assembly 162 to the motor housing 46, and the positioning ribs 172 are used to align the elbow 166 in the motor housing 46. The elbow 166 also has a pair of J-shaped grooves 173 formed therein for connecting a lower portion 218 of the liquid discharge assembly 162 to the upper portion 160 (FIG. 13). A plug 175 may be placed in the elbow 166 during dry vacuuming to plug an opening 177 in the elbow 166 (FIG. 3). The plug 175 interacts with the J-shaped grooves 173 in the elbow 166 to keep the plug 175 in place.

The elbow 166 forms a liquid-tight seal with the housing 164 by means of series of seals and closures. In this embodiment, O-rings are used as seals, but it is envisioned that any form of seal known in the art would suffice. A housing closure 174, formed integral with the elbow 166, caps off the housing 164 at the point where the housing 164 meets the elbow 166. Internal to the housing 164, a seal 176 disposed around the elbow 166 creates a liquid-tight seal between the housing 164 and the elbow 166, and a seal 178 disposed between the elbow 166 and the ball valve 58 prevents liquid from leaking between the two.

The ball valve 58 has a positional knob 180 formed integral with a flow regulation ball 182. The ball 182 has a passageway 184 bored therethrough, and the ball 182 is capable of being turned such that the passageway 184 is placed in fluid communication with the interior of the elbow 166. The positional knob 180 is situated outside the housing 164. As discussed above, a seal 178 keeps liquid from leaking between the ball 182 and the elbow 166. A similar seal 186 disposed on the opposite side of the ball 182 keeps liquid from leaking between the ball 182 and the housing 164. Another seal 188, disposed between the ball 182 and the knob 180, prevents liquid from leaking past the knob 180. The vacuum cleaner discharge opening 56 is defined by the housing 164 and is encircled by a threaded portion so that a user may connect a discharge hose 190 (FIG. 13) having a threaded connector 192 (e.g. a garden hose) to the housing 164 when discharging liquid, if desired.

Referring specifically to FIGS. 10, 11 and 12A–B, the ball valve 58 has two operational positions to control the flow rate of the liquid being discharged. FIG. 12A shows the ball valve 58 in the closed (OFF) position, when the pump is not discharging any liquid; and FIG. 12B shows the ball valve 58 in the open (ON) position, where the pump is discharging liquid from the vacuum cleaner 30. The knob 180 indicates which position the ball valve 58 is in by the location of one of two dogs 208a–b formed integrally with the knob 180.

When the dog 208a is pointed towards the vacuum cleaner discharge opening 56, as in FIG. 12A, the ball valve 58 is in the closed (OFF) position. In the closed (OFF) position, the flowpath between the interior of the elbow 166 and the vacuum cleaner discharge opening 56 is interrupted by the flow regulation ball 182. In this position, the flow regulation ball 182 is turned such that the passageway 184 runs perpendicular to, and out of fluid communication with, the interior of the elbow 166 and the vacuum cleaner discharge opening 56. The user can also turn the knob 180 so that the dog 208b is pointed towards the vacuum cleaner discharge opening 56, as in FIG. 12B. The ball valve 58 is then in the open (ON) position with the passageway 184 aligned with the interior of the elbow 166 and the vacuum cleaner discharge opening 56 creating a complete flow path from the interior of the elbow 166 to the vacuum cleaner discharge opening 56, which allows liquid to be discharged from the vacuum cleaner 30.

FIGS. 13–14 illustrate the vacuum cleaner 30 with a pump adapter assembly 210 installed. Referring to FIG. 13, the pump adapter assembly 210 includes a lower pump assembly 212, an inlet tube 214, a liquid intake assembly 216 and the lower portion 218 of the liquid discharge assembly 162. Referring to FIG. 14, the lower pump assembly 212, which is preferably made from ABS, extends up into the upper pump assembly 120 to complete the pump 128. The outward flare of the bottom portion of the upper outlet sidewall 136 facilitates insertion of the lower pump assembly 212 into the upper pump assembly 120. The pump adapter assembly 210 is secured in place by an oblong flange 219, which is formed integrally with a lower outlet sidewall 224 of the pump adapter assembly 210. When the pump adapter assembly 210 is in this secured disposition, the oblong flange 219 is disposed within the lid cage 106 across the oblong opening 112 of the bottom plate 110 such that the major axis of the oblong flange 219 lies substantially perpendicular to the major axis of the oblong opening 112. In this installed configuration, a pump inlet tube 220 of the lower pump assembly 212 extends up into the inlet sidewall 134 to complete the formation of the pump inlet 138, and the lower outlet sidewall 224 of the lower pump assembly 212 extends up into the upper outlet sidewall 136 to complete the formation of the pump outlet 130. The pump inlet tube 220 and the inlet sidewall 134 interact to form a liquid seal between the two. The liquid seal is formed by the interaction of a seal 222 with the inlet sidewall 134. The seal 222 is disposed in a groove 223 formed in the pump inlet tube 220. In a similar manner, the upper and lower outlet sidewalls 136, 224 also interact with each other to form a liquid seal. A seal 226 seated in a groove 228 formed in the lower outlet sidewall 224 interacts with the upper outlet sidewall 136 to form this liquid seal.

Referring again to FIG. 13, the pump inlet tube 220 fits into the inlet tube 214. The other end of the inlet tube 214 connects to a fitting 230 formed on the liquid intake assembly 216. The liquid intake assembly 216 has a hollow body 250 closed on the bottom by a plate 252. A cover plate 254 is connected to the top of the hollow body 250, and a screen 256 is disposed around the hollow body 250 between the bottom plate 252 and the cover plate 254. The fitting 230 is formed in the top of the hollow body 250. The fitting 230 extends upward through an opening 280 formed in the cover plate 254 and, as discussed above, connects with the inlet tube 214. The fitting 230 also extends downward into the hollow body 250, terminating at an inlet portion 231. Also formed in the top of the hollow body 250 is a liquid inlet opening 282 which provides fluid communication between the interior of the hollow body 250 and the tank 32.

On the outlet side of the pump 128, a fitting 240, formed integral with the lower outlet sidewall 224 of the pump 128, connects a discharge tube 244 of the liquid discharge assembly 162 to the lower outlet sidewall 224. This connection places the pump outlet 130 in fluid communication with the liquid discharge assembly 162. The discharge tube 244 extends from the lower outlet sidewall 224 to the elbow 166 of the upper portion 160 of the liquid discharge assembly 162 where a rotatable connector 284, attached to the end of the discharge tube 244, connects the discharge tube 244 to the elbow 166. The rotatable connector 284 is a free spinning element and is not fixed to the discharge tube 244. The rotatable connector 284 has a pair of bosses 286 integrally formed therewith (FIG. 11). To connect the discharge tube 244 to the elbow 166 of the upper portion 160, the user manipulates the rotatable connector 284 to line up the bosses 286 with the pair of J-shaped grooves 173 formed in the elbow 166 (FIG. 10). The user then inserts the rotatable connector 284 into the elbow 166, pushing the bosses 286 along the grooves 173 and twisting the rotatable connector 284 as necessary. When the bosses 286 reach the end of the grooves 173, the lower portion 218 of the liquid discharge assembly 162 is locked in place, and the liquid discharge assembly 162 is complete. A seal 287, disposed in a groove 289 at the end of the discharge tube 244, prevents liquid from leaking out of the elbow 166 into the tank 32 (FIG. 13).

The vacuum cleaner 30 may be operated in three modes: dry vacuuming mode, wet vacuuming mode and pumping mode. FIG. 3 shows the vacuum cleaner 30 in dry vacuuming mode configuration. In dry vacuuming mode configuration, the ball valve 58 is in the closed (OFF) position, the plug 175 is in the elbow opening 177, and the cloth filter 118 is in place around the lid cage 106 to keep dust from entering the opening 112. To convert the vacuum cleaner 30 to wet vacuuming mode configuration (without pumping liquid from the tank 32), the cloth filter 118 is removed, the ball valve 58 remains in the closed (OFF) position, and the plug 175 remains in the elbow opening 177. To operate the vacuum cleaner 30 in either dry or wet vacuuming mode, the user engages the actuator 62 and turns the motor 93 on. The operating motor 93 turns the air impeller 74, via the motor shaft 76, in the air impeller housing 70 which creates a vacuum in the tank 32. The user is now able to vacuum materials into the tank 32. When the user is finished vacuuming or the tank 32 is full, the user can stop vacuuming by engaging the actuator 62 to turn the motor 93 off. If, while in wet vacuuming mode, the level of liquid in the tank 32 gets too high, the mechanical shut-off and override assembly 150 will automatically shut off the motor 93.

To convert the vacuum cleaner 30 to pumping mode, the pump adapter assembly 210 is installed (FIGS. 13–14). To install the pump adapter assembly 210 and complete the pump 128, the user inserts the lower pump assembly 212 of the pump adapter assembly 210 through the opening 112 in the lid cage bottom plate 110, aligns the oblong flange 219 with the oblong opening 112 and pushes the oblong flange 219 through the oblong opening 112 so that the oblong flange 219 is now within the lid cage 106. The user inserts the lower pump assembly 212 into the lower impeller housing 126 of the upper pump assembly 120 and, once in, twists the pump adapter assembly 210 so that the major axis of the oblong flange 219 lies substantially perpendicular to the major axis of the oblong opening 112 to secure the pump adapter assembly 210 in place. As explained above, the outward flare of the bottom portion of the upper outlet sidewall 136 facilitates insertion of the pump adapter assembly 210 into the lower impeller housing 126. During insertion, the pump inlet tube 220 slides within the upper inlet sidewall 134 of the lower impeller housing 126, and the seal 222 forms a seal with the upper inlet sidewall 134. Similarly, the lower outlet sidewall 224 of the lower pump assembly 212 slides within the upper outlet sidewall 136 of the lower impeller housing 126, and the seal 226 forms a seal with the upper outlet sidewall 136. The completed pump 128 includes the pump inlet 138, formed by the interaction of the pump inlet tube 220 and the inlet sidewall 134; the pump impeller assembly 352 disposed in the pump chamber 129; and the pump outlet 130, formed by upper and lower outlet sidewalls 136, 224. The dimension of each of the parts of the pump 128 will be dependent on the desired flow rate of the pump 128. In addition, the power of the motor 93 may also affect the size and design of many of the components, including the pump impeller 104. To finish installation of the pump adapter assembly 210 and complete the formation of the liquid discharge assembly 162, the user connects the discharge tube 244 to the upper portion 160 of the liquid discharge assembly 162. As explained above, to connect the discharge tube 244 to the upper portion 160 of the liquid discharge assembly 162, the user rotates the rotatable connector 284 of the discharge tube 244 to align the bosses 286 of the rotatable connector 284 with the J-shaped grooves 173 of the elbow 166. Once the bosses 286 are aligned, the user pushes the bosses 286 along the grooves 173 until the bosses 286 reach the end of the groove 173 (FIG. 11). Once the bosses 286 are at the end of the grooves 173, the rotatable connector 284 and the lower portion 218 of the liquid discharge assembly 162 are locked in place, and the installation of the pump adapter assembly 210 and the formation of the liquid discharge assembly 162 are complete.

If the user desires to filter large particulates out of the material being drawn into the vacuum cleaner 30, the user may install a mesh collection bag in the tank 32 and connect the bag to the inlet 40. The mesh collection bag may be of the type disclosed and claimed in U.S. patent application Ser. No. 08/903,635 now allowed. Once the pump adapter assembly 210 is installed, and if desired, any collection bags, the user inserts the combined upper vacuum assembly 34/pump adapter assembly 210 into the tank 32 and then secures the lid 44 to the tank 32 with the latches 52.

Referring to FIG. 13, to operate the vacuum cleaner 30 in combined wet vacuuming mode and pumping mode operation, the user first turns the motor 93 "ON" by engaging the actuator 62. The now energized motor 93 simultaneously turns the air impeller 74 and the pump impeller 104 via the motor shaft 76/shaft extension 356 combination. The air impeller 74, rotating in the housing 70, reduces the pressure in the tank 32, creating a vacuum. The rotating air impeller 74 also creates a low pressure area in the interior space 392 of the air impeller 74 such that the interior space 392 of the air impeller 74 is at a relatively lower pressure than the vacuum in the tank 32. The vacuum created in the tank 32 draws air, liquid and/or other material into the tank 32 through the vacuum hose 43 and the inlet 40. If a mesh collection bag is in place around the inlet 40, the mesh collection bag will filter out the exceptionally large particulates being vacuumed into the tank 32 and will reduce the possibility of the pump 128 getting clogged. Even if the pump 128 is not being used, the mesh collection bag could still be used to filter large particulates out from the liquid being collected in the tank 32 so that when the tank 32 is poured or emptied into a drain, the large particulates will not clog the drain. The air that is drawn into the tank 32 passes through the foam filter 116, through the lid cage 106, into the motor housing 46, and finally is expelled out of the discharge slots 54.

As the motor 93 continues to operate, liquid will continue to collect in the tank 32. As liquid collects in the tank 32 and the liquid level rises, liquid will enter into the liquid intake assembly 216. The liquid will flow through the screen 256 and into the hollow body 250 through the opening 282. Liquid will then collect in the hollow body 250. When the liquid level in the hollow body 250 reaches the inlet portion 231 of the fitting 230, the pump 128 is capable of self-priming. Priming is possible because the low pressure area created by the air impeller 74 in the interior space 392 of the air impeller 74 creates a low pressure area in the pump chamber 129 as well, due to the air flow path between the interior space 392 of the air impeller 74 and the pump chamber 129 described above. The pump 128 will prime when the low pressure area in the pump chamber 129 is less than the pressure of the vacuum created in the tank 32. The low pressure in the pump chamber 129 will generally be lower than the pressure of the vacuum in the tank 32 as long as there is flow through the tank inlet 40. The low pressure area in the pump chamber 129 will then be sufficient to draw the liquid collecting at the inlet portion 231 of the fitting 230 up through the fitting 230, through the inlet tube 214, through the pump inlet 138 and into the pump chamber 129, priming the pump 128. Liquid flowing up into the pump chamber 129, however, will not enter the air flow cavities 384 of the pump impeller assembly 352, and consequently will not enter the area of the air impeller 74 or the motor 93, due to the centrifugal force generated by the rotating pump impeller 104. In most situations, the knob 180 must be in the closed (OFF) position to effect priming of the pump 128. Otherwise air from atmosphere will be pulled through the pump chamber 129 from the discharge opening 56 rather than liquid from the intake assembly 216.

In an alternative embodiment (not depicted), the shoulder 362 in the shaft extension 356 is extended to form a slide portion on the shaft extension 356. A mechanical operator is attached to the vacuum director 354 and operable to move the vacuum director 354 along the slide portion. The vacuum director 354 may be repositioned axially along the slide portion so that an upper portion of the director is even with the opening 72 formed in the air impeller housing 70. In this position, suction to the tank is substantially cut off and most of the vacuum force generated by the impeller 74 is directed to the pump chamber 129. As a result, the pressure differential between the low pressure area in the pump chamber 129 and the tank 32 is increased significantly, thereby further ensuring that the pump 128 is primed. To resume vacuuming of fluid after priming, the mechanical operator is manipulated so that the vacuum director 354 returns to the original position.

From the pump chamber 129, the pumped liquid will be pumped into the pump outlet 130 and into the liquid discharge assembly 162. If the knob 180 is in the closed (OFF) position, the liquid will back up behind the flow regulation ball 182 and will not discharge from the vacuum cleaner 30 through the discharge opening 56. Once the user, however, is ready to discharge liquid from the vacuum cleaner 30, the user may turn the knob 180 to the open (ON) position, allowing the vacuum cleaner 30 to discharge the pumped liquid through the discharge opening 56 and into the hose 190. Once the pump 128 is primed, it is not likely to lose its prime due to deterioration of the seal 222. When the pump 128 is pumping liquid out, the seal 222 is surrounded by liquid because both the area enclosed by the inlet sidewall 134 and the pump outlet 130 are filled with liquid. As such, even if the seal 222 begins to deteriorate, air will not enter the pumping chamber 129 and cause the pump 128 to lose its prime. The pump 128 will, however, operate less efficiently in this situation.

If, while vacuuming, the level of the liquid in the tank 32 gets too high, the mechanical shut-off and override assembly 150 will automatically shut-off the motor 93. When the liquid in the tank 32 gets to the level of the float 154, the liquid pushes the float 154 upward which pushes the float rod 152 upward. Eventually, the rising liquid will push the float rod 152 high enough to turn the switch 151 "OFF" which stops the motor 93 and stops the air impeller 74 and the pump impeller 104 from rotating. The float 154 should be placed at a height low enough so that the motor 93 is turned "OFF" before the level of liquid is high enough to begin entering the air impeller 74. Once the motor 93 has been turned "OFF", the user, when in pumping mode, has two options: the user may either remove the upper vacuum assembly 34 and manually empty the tank 32 or the user may bypass the float shut-off by mechanically overriding the float shut-off. When the user is finished either vacuuming or pumping with the vacuum cleaner 30, the user turns the vacuum cleaner 30 "OFF" by pushing downward on the user engageable actuator 62.

The vacuum cleaner of the present invention has significant advantages over prior vacuum cleaners. By providing a pump to remove liquid from the tank, liquid can be emptied easily into drains at a variety of heights. Driving the pump impeller off of the same motor which drives the air impeller significantly reduces the cost of the vacuum cleaner over designs which require a separate motor for the pump. By locating the pump in the tank directly below the air impeller, the pump impeller can be simply and efficiently driven off a single axle connected to the air impeller. Removability of the pump adapter assembly provides significant efficiency when the vacuum cleaner is used on dry material. Also, the priming assembly of the present invention provides a simple, easy to use, and cost effective priming system.

The foregoing detailed description has been given for clearness of understanding only, and no unnecessary limitations should be understood therefrom, as modifications would be obvious to those skilled in the art.

We claim:

1. A vacuum cleaner comprising:

a tank having an inlet for receiving liquid material and defining an interior;

a powered pump defining a pump interior;

a pump inlet disposed in the interior of the tank and in fluid communication with the pump, wherein the pump inlet places the interior of the pump in fluid communication with the interior of the tank;

an air impeller assembly disposed in air flow communication with the interior of the tank, the air impeller assembly includes a housing and a driven air impeller disposed in the housing, the housing defines an opening in air flow communication with the interior of the tank and the air impeller defines an interior space, wherein the driven impeller creates a relatively low pressure area in the interior of the tank and in the interior space defined by the air impeller; and a priming apparatus disposed between the air impeller and the pump, wherein the priming apparatus places the interior of the pump in air flow communication with the low pressure area generated in the interior space defined by the air impeller and creates a low pressure area in the pump inlet and the pump is primed when the liquid material received by the tank is drawn through the pump inlet and into the pump interior.

2. The vacuum cleaner of claim 1, wherein the priming apparatus comprises:

a shaft extension defining an interior air flow passage and an air flow aperture; and a vacuum director disposed between the air impeller and the shoulder of the shaft extension, the vacuum director and the shaft extension air flow aperture place the interior air flow passage of the shaft extension in air flow communication with the interior space defined by the air impeller.

3. The vacuum cleaner of claim 2, wherein the priming apparatus further comprises:

a pump impeller assembly connected to the shaft extension;

the pump impeller assembly defines an air flow channel.

4. The vacuum cleaner of claim 3, comprising:

a pump impeller cap defining a pump impeller receptacle; and a pump impeller disposed within the pump impeller receptacle to form air flow channels.

5. The vacuum cleaner of claim 3, wherein the air flow channel places the pump interior in air flow communication with the interior air flow passage of the shaft extension.

6. The vacuum cleaner of claim 1 comprising:

a liquid discharge assembly that defines a vacuum cleaner discharge opening, the liquid discharge assembly places the interior of the pump in fluid flow communication with the vacuum cleaner discharge opening for discharging the liquid received by the tank.

7. The vacuum cleaner of claim 6 comprising:

a valve disposed in the liquid discharge assembly between the pump and the vacuum cleaner discharge opening, wherein the valve regulates the discharge of liquid received by the tank from the vacuum cleaner.

8. The vacuum cleaner of claim 7, wherein the valve is movable between at least two positions:

a first position in which the valve blocks fluid flow communication between the pump and the vacuum cleaner discharge opening; and a second position in which the valve permits fluid flow communication between the pump and the vacuum cleaner discharge opening.

9. The vacuum cleaner of claim 6, wherein the pump includes an upper pump assembly and a lower pump assembly, the liquid discharge assembly includes an upper portion and a lower portion and the vacuum cleaner further comprises:

a pump adapter assembly which includes the lower pump assembly and the lower portion of the liquid discharge assembly, wherein the pump adapter assembly is removable from the vacuum cleaner and the pump adapter assembly separates from the vacuum cleaner along the connection between the upper and lower pump assemblies and along the connection between upper and lower portions of the liquid discharge assembly.

10. A vacuum cleaner comprising:

a tank having an inlet for receiving liquid material and defining an interior;

a powered pump defining a pump interior;

a pump inlet disposed in the interior of the tank and in fluid communication with the pump, wherein the pump inlet places the interior of the pump in fluid communication with the interior of the tank;

an air impeller assembly disposed in air flow communication with the interior of the tank, the air impeller assembly includes a housing and a driven air impeller disposed in the housing, the housing defines an opening in air flow communication with the interior of the tank and the air impeller defines an interior space, wherein the driven impeller creates a relatively low pressure area in the interior of the tank and in the interior space defined by the air impeller; and a priming apparatus disposed between the air impeller and the pump, wherein the priming apparatus comprises a shaft extension between the air impeller and the pump, and the shaft extension provides air flow communication between the interior space and the interior of the pump.

11. The vacuum cleaner of claim 10, wherein the priming apparatus comprises:

an interior air flow passage and an air flow aperture of the shaft extension; and a vacuum director disposed between the air impeller and the shaft extension, wherein the vacuum director and the shaft extension air flow aperture place the interior air flow passage of the shaft extension in air flow communication with the interior of the pump.

12. The vacuum cleaner of claim 11, wherein the priming apparatus further comprises:

a pump impeller assembly connected to the shaft extension;

the pump impeller assembly includes a pump impeller cap and a pump impeller.

13. The vacuum cleaner of claim 12, wherein the pump impeller cap defines a pump impeller receptacle and the pump impeller is disposed within the pump impeller receptacle.

14. The vacuum cleaner of claim 12, wherein the pump impeller assembly defines at least one air flow channel that places the pump interior in air flow communication with the interior air flow passage of the shaft extension.

15. The vacuum cleaner of claim 10 comprising:

a valve disposed in the liquid discharge assembly between the pump and the vacuum cleaner discharge opening, wherein the valve regulates the discharge of liquid received by the tank from the vacuum cleaner.

16. The vacuum cleaner of claim 15, wherein the valve is movable between at least two positions:

a first position in which the valve blocks fluid flow communication between the pump and the vacuum cleaner discharge opening; and a second position in which the valve permits fluid flow communication between the pump and the vacuum cleaner discharge opening.

17. The vacuum cleaner of claim 16, wherein the pump includes an upper pump assembly and a lower pump assembly, and the vacuum cleaner further comprises:

a pump adapter assembly which includes the lower pump assembly and the lower portion of the liquid discharge assembly, wherein the pump adapter assembly is removable from the vacuum cleaner and the pump adapter assembly separates from the vacuum cleaner along the connection between the upper and lower pump assemblies and along the connection between upper and lower portions of the liquid discharge assembly.

* * * * *